Figure 1:
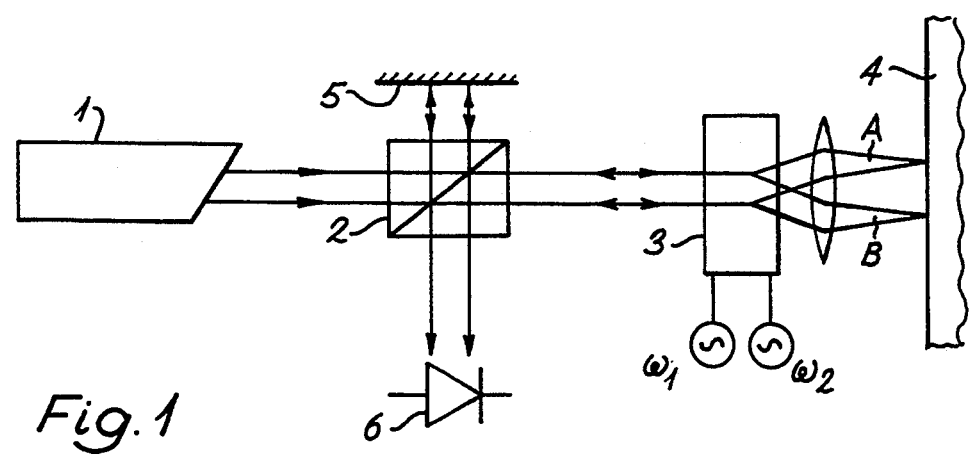

United States Patent [19]

Somekh

[11] Patent Number: 5,369,489
[45] Date of Patent: Nov. 29, 1994

[54] TIME DIVISION MULTIPLEXED MICROSCOPY

[75] Inventor: Michael G. Somekh, Wollaton, England

[73] Assignee: British Technology Group Ltd., London, England

[21] Appl. No.: 971,972

[22] Filed: Feb. 19, 1993

[30] Foreign Application Priority Data

Aug. 20, 1990 [GB] United Kingdom ............ 9018215.5

[51] Int. Cl.$^5$ ................................................ G01B 9/02
[52] U.S. Cl. ..................... 356/359; 356/360; 356/349
[58] Field of Search ............... 356/349, 359, 360, 354, 356/357

[56] References Cited

U.S. PATENT DOCUMENTS

| | | |
|---|---|---|
| 4,360,271 | 11/1982 | Downs et al. |
| 4,611,915 | 9/1986 | Gillard et al. |
| 4,627,730 | 12/1986 | Jungerman et al. ................ 356/349 |
| 4,741,620 | 5/1988 | Wickramasinghe |
| 4,743,119 | 5/1988 | Ida |

FOREIGN PATENT DOCUMENTS

| | | |
|---|---|---|
| 108497 | 5/1984 | European Pat. Off. |
| 167410 | 1/1986 | European Pat. Off. |
| 216163 | 1/1989 | European Pat. Off. |
| 2012450 | 7/1979 | United Kingdom |
| 8909380 | 10/1989 | WIPO |

OTHER PUBLICATIONS

Patent Abstracts of Japan, vol. 10, No. 157, Jun. 1986, JP 61 010 707.

Primary Examiner—Samuel A. Turner
Assistant Examiner—Robert Kim
Attorney, Agent, or Firm—Cushman, Darby & Cushman

[57] ABSTRACT

Optical apparatus for measuring the topographic properties of a surface uses a beam of coherent radiation which is split by a beam splitter (2) into a reference beam and a probe beam. The probe beam at is modulated by a Bragg cell which is switched at two frequencies ($\omega_1, \omega_2$). A detector (6) recombines the components of the probe beam after reflection to produce a plurality of tone bursts the phase differences of which correspond to variations in the surface topography.

5 Claims, 3 Drawing Sheets

TIME DIVISION MULTIPLEXED MICROSCOPY

This invention relates to optical apparatus and, in particular, to time division multilplexed amplitude and phase microscopes.

In our prior British Patent Application No. 8907230.0 we describe a scanning optical microscope which simultaneously permits the measuring of the differential of the phase and amplitude of light reflected from an object.

We have now devised a time division multiplexed microscope which overcomes many of the disadvantages of the previous implementations of the combined differential amplitude and phase systems. Essentially it permits the achievement of optimum modulation for both the phase and intensity signals, which means much superior signal to noise is possible. Optically the performance is achieved by using a common reference arm which interferes with each beam independently, the output from each of these interferometers is then compared in the electronics. The system retains advantages of common path operation reported for previous implementations but allows the intensity modulation to be altered without effecting the interference efficiency in the manner noted with our previous systems.

According to the present invention there is provided optical apparatus for measuring the topographic properties of a surface comprising a source of coherent radiation, means for splitting a beam of radiation from said source into a reference beam and a probe beam, means for sequentially modulating said probe beam at at least two frequencies, means for recombining said probe beam after reflection and said reference beam to create an interference pattern and detector means to detect said interference pattern and to produce a plurality of tone bursts corresponding to sequential variations in said interference pattern.

Figure 2:
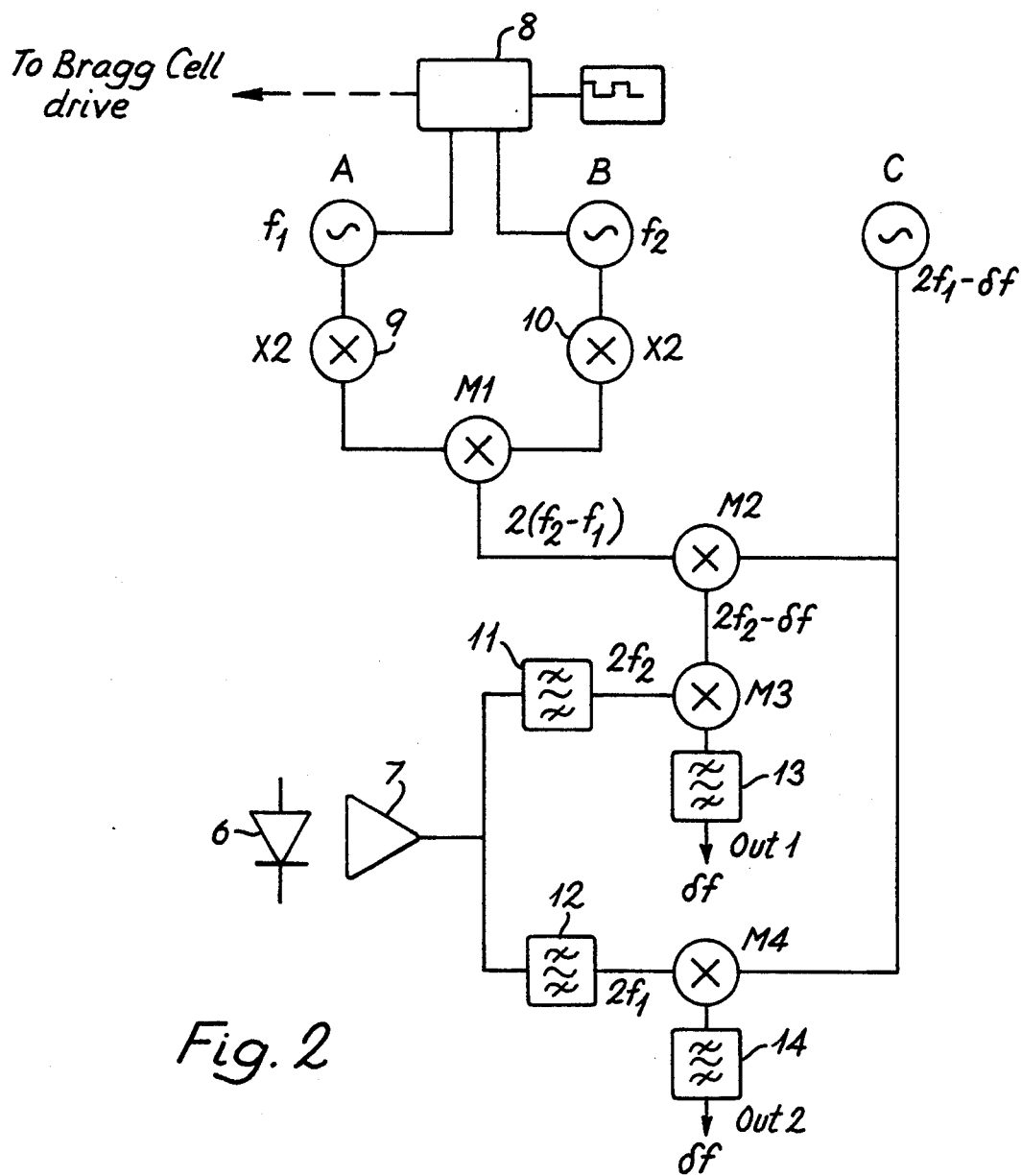
Figure 3:
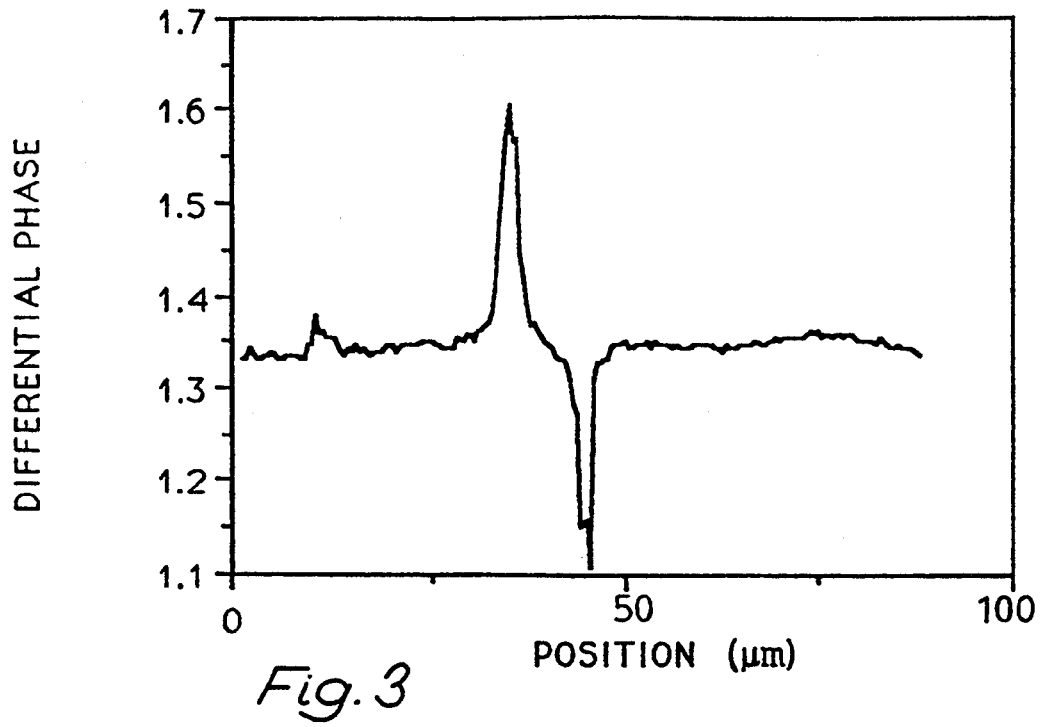
Figure 4:
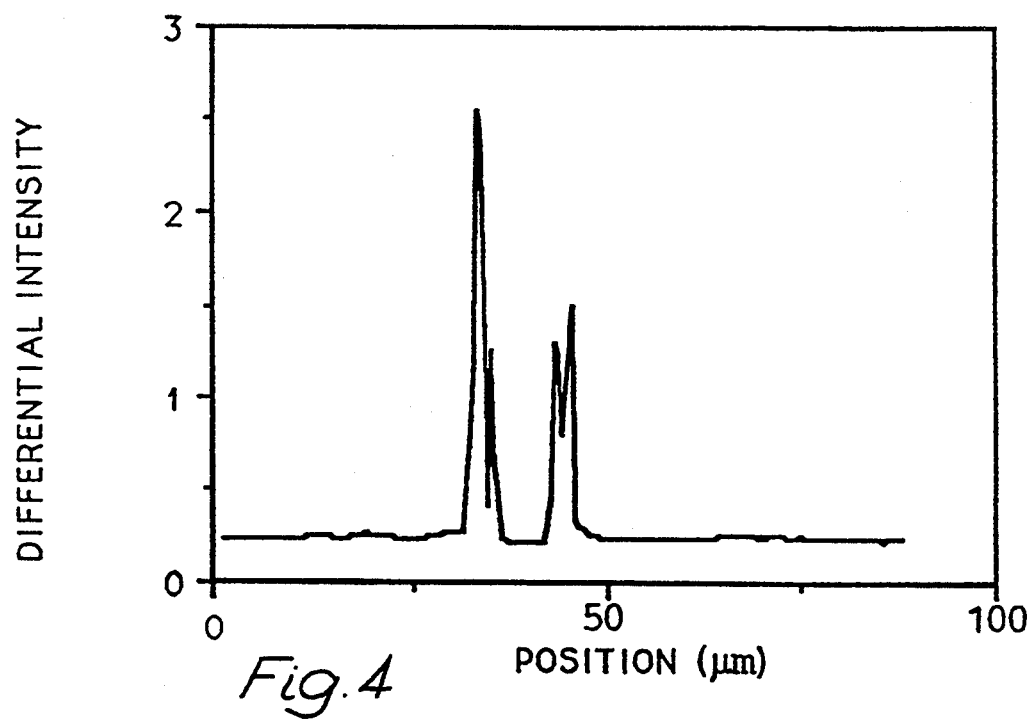
Figure 5:
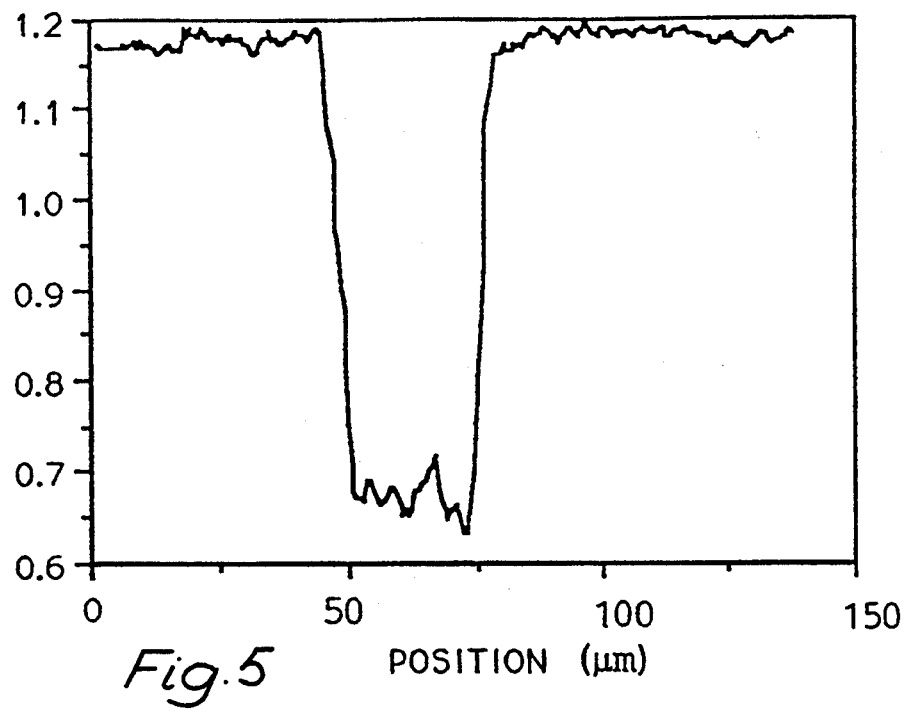
Figure 6:
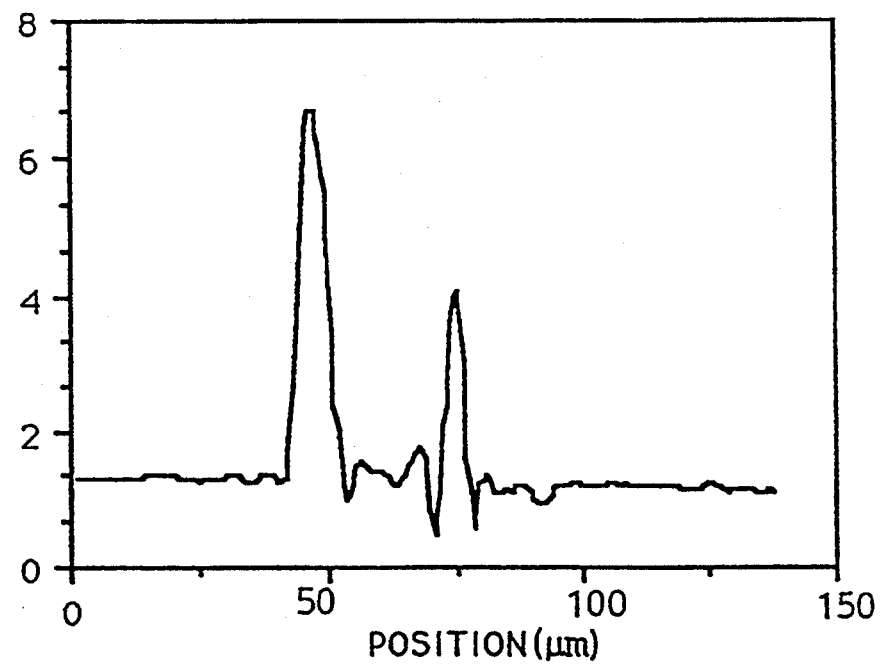

The invention will now be particularly described with reference to the accompanying drawings in which:

FIG. 1 is a diagrammatic representation of apparatus in accordance with an embodiment of the invention;
FIG. 2 is a schematic drawing of an electronic circuit for use with the apparatus of FIG. 1; and FIGS. 3–6 are graphs showing results obtained with the apparatus of FIG. 1.

Referring now to the drawings, FIG. 1 shows the configuration of the optical system of one embodiment of the invention. Light from a laser 1 passes through a beam splitter 2 to an acousto-optic Bragg cell 3 where it is deflected through an angle proportional to the frequency of the acoustic wave incident passing through the cell, $\omega_1$ or $\omega_2$. The light passing through the Bragg cell is focused telecentrically on to a sample 4 after which it is reflected back through the Bragg cell where it suffers a second frequency shift. A second component of the light beam from the laser 1 is reflected from a reference mirror 5 (the common reference arm) and interferes with each reflected beam in turn giving interference terms at $2\omega_1$ and $2\omega_2$ respectively which are detected by a photodiode 6. If these signals are mixed electrically the relative the phase between the two signals corresponds to the relative optical phase between the two beams. Since these beams are close to each other on the sample the phase difference gives the differential phase on the object surface.

The system interferes each beam with the common reference arm which allows each beam to be modulated separately whilst still allowing the relative phase between the two sample beams to be recovered. The two beams are modulated with antiphase square waves so that beam A is 'on' whilst beam B (shown in FIG. 1) is 'off', and vice versa. This is the optimum modulation scheme for differential intensity signal since gives the best signal to noise and is much easier to implement practically. If the two beams were interfered directly this modulation would not give any interference signal since the two beams would not overlap in time. The common reference beam allows one to achieve this interference provided an appropriate electronic detection is used. This is shown in FIG. 2.

The output from the photodetector 6 which is fed to a pre-amplifier 7 is two tone bursts $2f_1$, $2f_2$ in antiphase. Since neither overlap in time, they cannot be mixed to recover the relative phase. The tone bursts are fed by way of a single pole, double throw switch 8 and multipliers 9,10 to a mixer M1. The output at twice the difference frequency is fed to a further mixer M2. Output from the pre-amplifier 7 is fed to a pair of filters 11,12 which select the second harmonics of the fundamental frequencies of the two tone bursts. The second harmonics are fed to further mixers M3,M4 and the outputs taken by way of filters 13,14. The purpose of the electronic configuration is twofold <a) to mix the signals to a common frequency and (b) to pass them through a sufficiently narrow filter which, whilst not substantially reducing the data rate, converts each signal into a continuous wave signal whose phase can be compared at the two outputs shown on FIG. 2.

The net result is that we have constructed two interferometers operating at different times. Each operates essentially independently in the optical system. The phase of each is, however, recovered because they are interfered with the same reference beam. The electronic configuration then recovers the relative phase between the two beams in the manner described above. The effects of vibrations are cancelled because each beam traverses the same path. The preliminary results illustrated in FIG. 3 to 6 show respectively the differential phase and intensity over a dust spot and the differential phase and intensity as a step is scanned. These indicate that, provided a stabilised laser source is used, one can achieve excellent results which are superior in terms of signal to noise to those obtained previously with the direct interference systems. The system is also much less sensitive to very fine adjustment that is required in the sinusoidally modulated scheme.

With the apparatus of the present invention, the differential intensity and differential phase signal have an improved signal to noise ratio. In the case of the differential intensity signal the requirement to get a very accurate phase difference between the drives to each beam is a lot easier to achieve so that spurious signals are reduced. This is made possible by the use of two interferometers operating in parallel in a time division multiplexed manner.

I claim:

1. An optical apparatus for measuring the topographic properties of a surface comprising:
    a source of coherent radiation,
    means for splitting a beam of radiation from said source into a reference beam and a probe beam comprising a plurality of component beams,
    means for successively modulating said component beams at at least two frequencies, means for successively recombining said component beams after reflection with said reference beam to create an interference pattern, and detector means for detecting said interference pattern and for producing a plurality of tone bursts corresponding to successive variations in said interference pattern.

2. An optical apparatus for measuring the topographic properties of a surface as claimed in claim 1 wherein said means for modulating said component beams comprises an acousto-optic Bragg cell adapted to deflect said component beams through an angle dependent on an applied modulating frequency.

3. An optical apparatus for measuring the topographic properties of a surface as claimed in claim 1 or 2 wherein said detector means includes mixer means for mixing signals corresponding to said tone bursts to a common frequency.

4. An optical apparatus for measuring the topographic properties of a surface as claimed in claim 3 further including filter means for converting respective ones of said signals to substantially continuous wave signals.

5. An optical apparatus for measuring the topographic properties of a surface as claimed in claim 4 wherein said detector means includes a second mixer means and a second filter means for producing output signals for phase comparison.

* * * * *